(12) United States Patent
Wielstra

(10) Patent No.: US 11,255,043 B2
(45) Date of Patent: Feb. 22, 2022

(54) IRONING SYSTEM WITH STEAM PROMOTER COATING

(71) Applicant: KONINKLIJKE PHILIPS N.V., Eindhoven (NL)

(72) Inventor: Ytsen Wielstra, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 187 days.

(21) Appl. No.: 16/322,318

(22) PCT Filed: Oct. 16, 2017

(86) PCT No.: PCT/EP2017/076333
§ 371 (c)(1),
(2) Date: May 30, 2019

(87) PCT Pub. No.: WO2018/069545
PCT Pub. Date: Apr. 19, 2018

(65) Prior Publication Data
US 2021/0131022 A1 May 6, 2021

(30) Foreign Application Priority Data
Oct. 14, 2016 (EP) ..................... 16193851

(51) Int. Cl.
*D06F 75/14* (2006.01)
*D06F 75/12* (2006.01)
(Continued)

(52) U.S. Cl.
CPC ............... *D06F 75/14* (2013.01); *C09D 1/02* (2013.01); *C09D 5/10* (2013.01); *C09D 5/103* (2013.01);
(Continued)

(58) Field of Classification Search
CPC .......... D06F 75/14; D06F 75/12; D06F 75/38; D06F 75/16; D06F 75/18; C09D 7/61;
(Continued)

(56) References Cited

U.S. PATENT DOCUMENTS 2,967,365 A * 1/1961 Extale ..................... D06F 75/18
38/77.83
3,150,937 A * 9/1964 Link ..................... F16D 69/027
428/614
(Continued)

FOREIGN PATENT DOCUMENTS

EP 2068075 A2 6/2009
GN 1051214 A 5/1991
(Continued)

*Primary Examiner* — Ismael Izaguirre
(74) *Attorney, Agent, or Firm* — Schott, P.C.

(57) ABSTRACT

The invention relates to an ironing system comprising a steam generating device comprising a steam chamber provided with a coating (11) comprising a coating base material (15) with metal particles (25) at least partly embedded in the coating base material (15), wherein the coating base material (15) comprises a mixed metal silicate compound, wherein the mixed metal silicate compound comprises an alkali metal element and a first metal element, wherein the metal particles (25) comprise a second metal element, and wherein the first metal element and the second metal element are the same chemical element of the periodic table of the elements.

12 Claims, 4 Drawing Sheets

(51) Int. Cl.
  *D06F 75/38* (2006.01)
  *C09D 7/61* (2018.01)
  *C09D 1/02* (2006.01)
  *C09D 5/10* (2006.01)
  *C23C 24/08* (2006.01)
  *C09D 7/40* (2018.01)

(52) U.S. Cl.
  CPC ............ *C09D 5/106* (2013.01); *C09D 7/61* (2018.01); *C09D 7/70* (2018.01); *C23C 24/08* (2013.01); *D06F 75/12* (2013.01); *D06F 75/38* (2013.01)

(58) Field of Classification Search
  CPC ... C09D 7/70; C09D 1/02; C09D 5/10; C09D 5/103; C09D 5/106; C23C 24/08
  See application file for complete search history.

(56) References Cited

U.S. PATENT DOCUMENTS

| | | | |
|---|---|---|---|
| 3,247,006 A * | 4/1966 | Hoge | B41M 5/124 428/317.9 |
| 3,499,237 A | 3/1970 | Piper | |
| 3,551,183 A * | 12/1970 | Vondracek | D06F 75/18 427/318 |
| 3,694,942 A | 10/1972 | Vondracek | |
| 4,209,555 A | 6/1980 | Stewart | |
| 5,060,406 A * | 10/1991 | Verweij | D06F 75/18 38/77.83 |
| 5,167,988 A | 12/1992 | Yano | |
| 5,390,432 A | 2/1995 | Boulud | |
| 8,453,360 B2 | 6/2013 | Wielstra | |
| 8,561,328 B2 * | 10/2013 | Wielstra | F22B 37/04 38/77.83 |
| 2013/0344318 A1 | 12/2013 | Klotz | |

FOREIGN PATENT DOCUMENTS

| | | |
|---|---|---|
| GN | 1777508 A | 5/2006 |
| GN | 101952656 A | 1/2011 |
| JP | 2011-509695 A | 3/2011 |
| WO | 2009044320 A2 | 4/2009 |
| WO | 2014207186 A1 | 12/2014 |
| WO | 2016116319 A1 | 7/2016 |

\* cited by examiner

IRONING SYSTEM WITH STEAM PROMOTER COATING

This application is the U.S. National Phase application under 35 U.S.C. § 371 of International Application No. PCT/EP2017/076333, filed on Oct. 16, 2017, which claims the benefit of International Application No. 16193851.9 filed on Oct. 14, 2016. These applications are hereby incorporated by reference herein.

FIELD OF THE INVENTION

The invention relates to an ironing system comprising a steam generating device provided with a coating.

BACKGROUND OF THE INVENTION

Steam generating devices comprising coatings are known in the art. U.S. Pat. No. 3,694,942, e.g., describes a coating composition containing sodium silicate and hydrated alumina that is deposited on a surface of the flash evaporation chamber in a steam ironing device. The coating is heated, most conveniently by application to an already heated surface and preferably heated to at least about 375° F., to convert it to a more insoluble form.

SUMMARY OF THE INVENTION

Heating water above 100° C. at 1 atmosphere will transform it into steam. However when water is applied to a very hot surface to generate steam, the steam can form an insulating layer between the surface and the water droplet thereby effectively slowing down the evaporation of water. The water droplet starts to bounce on the surface instead of evaporating into steam. This effect is called the Leidenfrost effect and occurs generally above 160° C.

In practice this effect is observed in steam irons where water is added into the so-called steam chamber, which steam chamber generates steam for the ironing process. Various methods can be employed to prevent the Leidenfrost effect ranging from special structures present in the chamber like ribs etc. to help to spread the water or the use of a metal mesh or coatings. Especially, coatings can be effective in preventing the effect.

Two different mechanisms may prevent the Leidenfrost effect using coatings.

A first mechanism is based on thermal insulation of the hot aluminum surface. The coating slightly lowers the surface temperature in the absence of water and prevents the water from touching the hot aluminum substrate. At the moment that some water touches the surface, the surface is immediately cooled down effectively to below Leidenfrost effect temperatures. Hence for this type of steam promoter materials, it is essential that they are thermally insulating and do not have a large-scale open porosity (e.g. high temperature resistant organic materials).

The second mechanism counteracts the Leidenfrost effect by a combination of good wetting, absorption of water into the porous structure, and a high surface roughness. For this mechanism especially inorganic materials are suited.

The layer thickness seems to be an important parameter, but its influence depends on the type of steam promoter material. Thick non-porous layers will prevent the Leidenfrost effect up to high temperatures. However, if the layer is too thick, the thermal conduction through the layer may limit the evaporation rate too much. Especially, at lower temperatures and high dosing rates, water may leak out of the iron. If the layer is too thin, the evaporation rates at low temperatures may be higher. However, the system may be more prone to the Leidenfrost effect, and water touching the surface can bounce off, leading to spitting of the steam iron at high temperatures.

For porous layers high evaporation rates both at low temperatures (due to better spreading), and at high temperatures can be achieved. The layer thickness may be limited by the mechanical properties of the coating. Flaking can be observed if layers exceed a certain critical thickness.

An ideal steam promoter material would combine the best characteristics of both categories (Leidenfrost effect shifted to high temperatures, good wetting and water spreading into a porous structure), without having the disadvantages (thermal insulation, bad wetting, and flaking).

Some known coatings may work rather positive in preventing the Leidenfrost effect in steam irons. However, the mechanical strength may still be one of the drawbacks. In time, scale will build up (due to the porosity of the coating) in and on the layer and the layer may flake due to internal stress build up during growing of the scale layer. Flaking may be positive with respect to preventing the layer to becoming too thick that the steaming rate is slowed down too much (due to the heat insulating effect of the layer). Flaking, however may remove the whole layer leaving bare aluminum or a too thin layer that Leidenfrost will occur again.

Hence, it is an aspect of the invention to provide an alternative steam generating device comprising a steam (generating) chamber provided with a coating, which preferably further at least partly obviates one or more of above-described drawbacks.

The invention is defined by the independent claims. The dependent claims define advantageous embodiments.

In a first aspect, the invention provides an ironing system comprising a steam generating device comprising a steam chamber provided with a coating comprising a coating base material with metal particles at least partly embedded in the coating base material, wherein the coating base material comprises a mixed metal silicate compound ("mixed metal silicate"), wherein the mixed metal silicate compound comprises an alkali metal element and a first metal element, especially wherein the metal particles comprise a second metal element, and especially wherein the first metal element and the second metal element are the same chemical element of the periodic table of the elements.

According to the invention, a steam generating device is provided, which device comprises a steam chamber provided with a coating. The presence of the mixed metal silicate, especially embedding the metal particles, provides a very durable coating. The coating shows most of the desirable features of a steam promoter coating: it not only shifts the Leidenfrost effect to higher temperatures, shows good wetting behavior and water spreading into the porous structure thereof, the coating also may substantially not deteriorate when a scale layer formed on top (and in the pores) of the coating flakes (off). Especially, with such coating, flaking may occur at an interface of the scale layer and the (top of) the coating. Further, such steam generating device may comprise a steam generator, such as e.g. a flash evaporation chamber. Hence, the steam chamber may in embodiments also be indicated as steam generating chamber. The steam chamber may have a metal wall, especially aluminum, on which the coating is applied. Instead of the term "device" also the term "apparatus" may be applied.

The mixed metal silicate—comprising an alkali metal element, the first metal element and a silicon element—may provide an improved coating, especially having an improved durability, compared to an analogous coating comprising an alkali metal silicate that comprises the same alkali metal element and said silicon element in the coating but lacking said first metal element. An improved strength of the coating may be the result of an incorporation of the first metal element in the alkali metal silicate. The terms "alkalisilicate", "alkali silicate", or "alkali metal silicate" refer to a silicate not comprising the first metal element, such as water glass. The term "mixed metal silicate" refers to an alkali metal first metal silicate, i.e. the mixed metal silicate, a silicate comprising the alkali metal element and the first metal element, such as $Li_aAl_bSi_cO_d$, $Na_eZn_fSi_gO_d$, and $K_hAl_iSi_jO_d$, wherein the subscripts indicate the mutual ratio of the different elements. For instance in $Li_aAl_bSi_cO_d$ the ratio of Li:Al:Si:O comprises a:b:c:d. It is however noted that the exact composition may not always be clearly defined. Especially, (all of the) a, b, c, d, e, f, g, h, i, and j are non-zero. The term "coating base material" especially refers to the mixed metal silicate and optionally also present alkali metal silicate, which may especially form a matrix for the metal particles and optionally other material, such as a filler.

Especially, the coating may be prepared from an alkali metal silicate, such as water glass and metal particles (providing the mixed metal silicate comprising metal particles) (see also below).

It has been found that the addition of metal particles to an alkali metal silicate, lowers the solubility of the cured coating (comprising a mixed metal silicate). It is believed that a reaction of the metal with the alkali silicate is (partly) responsible for this beneficial effect. Mixing metal with an alkali metal silicate, at a certain ratio of Si:Metal:alkali metal provides coating compositions comprising a dispersion (especially a "slurry") of metal particles in an alkali metal silicate that may still be liquid after mixing, but the provided mixed metal silicate may become insoluble after drying/curing at elevated temperature (see also below). It seems that incorporation of at least part of the metal in the silicate has effectively decreased the solubility of the silicate after drying/curing.

Without being bound to theory, it is hypothesized that using metal particles as source of the metal (element) allows for providing the required amount of metal reacting to insolubilize the alkali silicate. The metal of the metal particle may react quickly (already) at room temperature (especially during producing the coating at a surface, see also below) with the silicate under alkaline conditions, especially wherein the metal particle is embedded in the silicate. At increasing temperature (e.g. during curing of the coating), mobility of alkaline elements may increase, allowing more of the metal to be dissolved and diffuse and further react with the silicate, especially densifying the coating. Especially, metal of the metal particle may dissolve until the coating comprises such a density that the alkaline elements substantially have become immobile. Especially, said mobility may be proportional with the curing temperature. Especially, said mobility may be inversely proportional with the density of the coating. In addition, said quick reaction of the metal particle at room temperature embedding the particle in the silicate may prevent corrosion of the metal (particle). Especially, a presence of corroded metal may worsen the product quality of the coating, especially the strength of the coating. Experimentally, it for instance was found that replacing aluminum particles by corroded aluminum ($AlOH_3$) resulted in a compromised strength of the coating and especially also in adhesion problems of the coating at an aluminum soleplate (see further below).

The resulting mixed metal silicate coating shows good adhesion to an aluminum substrate, is substantially insoluble in water, and moreover may provide a good steaming performance. A further advantage of the coating composition according to the invention is that it is easily sprayable.

A further advantage of the coating composition is that by adding metal particles the heat conductivity of the final coating may be optimized. Especially, the steam generating properties of the coating may be controlled by adding metal particles.

The (optionally present) embedded metal particles may especially provide a further self-healing effect of e.g. small cracks in the coating since metal elements from the metal particles (in the coating base material) may eventually dissolve and/or migrate into the mixed metal silicate compound to further strengthen the silicate (especially during heating).

The coating may promote steam formation. Hence, herein the terms "steam promotor coating" and "steam promoter" also relate to the "coating" of the invention. Especially, the coating is a hydrophilic coating. Especially, the coating is provided in the steam chamber at a surface, especially a steam chamber surface.

Hence, the coating, especially the mixed metal silicate (compound) comprises a metal element. Especially, the first metal element is integrated in the mixed metal silicate compound. In the dried coating, the first metal element may be part of the lattice of the mixed metal silicate compound. Especially, the first metal element may have dissolved and/or migrated in an alkali metal silicate (solution) and have formed a corresponding mixed metal silicate upon drying, especially upon heating (curing).

The metal element may especially homogeneously be incorporated in the mixed metal silicate. The mixed metal silicate (compound) may also comprise regions comprising substantially only alkali metal silicate and other regions comprising mixed metal silicate. Herein, with respect to a coating, the term "mixed metal silicate (compound)" especially relates to a coating comprising an (alkali metal) silicate compound comprising some further (first) metal elements incorporated in the compound. Hence, in at least part of the alkali metal silicate the first metal element has been incorporated in a (new) structure due to a chemical reaction of the first metal with the alkali metal silicate (at elevated temperatures). Especially, the chemical reaction of the first metal element with the alkali metal silicate may comprise a self-limiting reaction. Especially, metal particles may be embedded in the coating base material The mixed metal silicate comprises the first metal element. The metal particle comprises the second metal element. As described above, the first metal element and the second metal element may especially be the same (metal) chemical element (of the periodic table of elements), especially relating to the same metal. Hence, unless otherwise indicated in the text, the term "metal element" may relate to the "first metal element"; the term may also relate to the "second metal element". Correspondingly, herein the term "first metal element" may especially relate to a (particular) metal (as such), whereas the term "second metal element" may relate to the same (particular) metal (as such), if not indicated otherwise. Especially said (particular) metal may be present in the coating in different conformations; it may be present in the metallic particle, e.g. comprising a (pure)

metal or an alloy. Metal may also be present in the silicate, e.g. comprising a metal ion, and being part of the (mixed metal) silicate compound.

Herein the term "metal" may also relate to a plurality of (different) metals. Likewise, the terms "metal element", "first metal element", and "second metal element" may relate to respectively a plurality of (different) metal elements, first metal elements, and second metal elements.

Hence, the metal particles comprise a second metal element. The metal particles in embodiments may comprise a plurality of second elements. The metal particles may comprise alloys. The metal particles may also comprise further elements, such as elements providing a coating (at the metal particle), elements used for passivating the metal (particle), metal oxides, etc. Especially, the metal particles comprise substantially only the metal element. In embodiments, at least 90%, especially at least 95%, even more especially at least 99% of a weight of the metal particles consists of the second metal element.

The first metal element and the second metal element (especially the metal) especially may comprise a metal that may dissolve easily in a (strong) caustic environment (caused by an alkali metal silicate) and may form a corresponding mixed metal silicate upon curing. Especially, the metal may react with the alkali metal silicate to form the mixed metal silicate. In embodiments, the metal comprises calcium or magnesium. In further embodiments, the metal comprises zinc or aluminum. Yet in further embodiments, the metal comprises one or more of gallium, indium, cupper, and nickel. The metal element may especially comprise a valence higher than (+)1. Especially, the metal element comprises a valence of 2 or 3. Without being bound to theory, it is thought that a higher valence of the metal element compared to alkali metals may be responsible for the increased strength.

Hence in embodiments, the metal element, especially the second metal element, and/or especially the first metal element, is selected from the group consisting of calcium, magnesium, zinc, and aluminum. Especially, the metal element, especially the first metal element, and/or especially the second metal element, is zinc or aluminum.

Especially, the metal element may advantageously dissolve in an aqueous or humid alkali metal silicate (solution) because of an alkalinity of the alkali metal silicate.

The metal particles, especially the metal (element) and/or a size of the metal particles, are especially selected such that a rate of the reaction between the metal (element) and the alkali metal silicate allows to further apply the mixture (of the metal and the alkali metal silicate), e.g. by spraying it on a (steam chamber) surface without becoming solidified to too viscous yet (see further below).

The alkali metal silicate may comprise any alkali metal element. In embodiments, the alkali metal element is lithium. In a further embodiment, the alkali metal element is sodium. Yet, in a further embodiment, the alkali metal is potassium. In yet further embodiments, the alkali metal element relates to a plurality of different alkali metal elements, especially two or more of the above described alkali metal elements. Hence, in embodiments, the mixed metal silicate compound comprises one or more alkali metal elements selected from the group consisting of lithium, sodium, and potassium. Especially, the alkali metal silicate (compound) comprises one or more alkali metal elements selected from the group consisting of lithium, sodium, and potassium. When the alkali metal element relates to a plurality of different alkali metal elements, the corresponding mixed metal silicate compound comprises at least one or more of these alkali elements (of the plurality of different alkali metal elements).

The coating may further comprise filler material ("filler(s)"). Especially, filling may improve steaming performance of the coating, strength of the coating, and flaking of scale. Fillers may be selected to be compatible with the coating base material, especially the mixed metal silicate. Especially, fillers may be selected to preserve hydrophilic properties of the coating. Additionally, a high temperature and hydrolysis resistance of the filler material is required. Especially, the filler material may comprise inorganic materials. The filler material may, e.g., comprise glass powder, silica powder, etc. In embodiments, the filler material comprises silica particles, especially glass particles. Herein, the terms "silica particles" and "glass particles" may especially relate to silica beads and glass beads respectively. The term "glass particles" may also relate to glass particles having any other dimension, such as to glass flakes, or glass spheres, glass powder, etc. Likewise the term "silica particles" may relate to silica particles comprising different types of dimensions.

Especially, the term "silica particles" may relate to a plurality of (different) silica particles (especially comprising different shapes/dimensions). In embodiments, silica particles comprise a combination of glass flakes and silica powder. In embodiments, silica particles may (further) relate to precipitated silica, fumed silica or colloidal silica. Examples of silica particles comprise, e.g., commercially available Ludox® colloidal silica dispersions, a fumed silica known by the tradename Aerosil™, glass flakes, such as micronized glass flakes marketed by Glass Flake Ltd. under the code GF001. Especially, silica particles may relate to glass particles, such as glass flakes. In embodiments, the coating (further) comprises glass flakes.

A characteristic dimension of the silica particles may especially be selected from the range of 0.1 nm to 1000 µm. In embodiments, a characteristic dimension of the silica particles is selected from the range of 0.1 nm to 1000 nm, especially 1 nm to 500 nm. In further embodiments, the characteristic dimension is selected from the range of 0.1 µm to 1000 µm, especially 1 to 100 µm, even more especially from the range of 1 to 5 µm and/or from the range of 10 to 100 µm. Herein the term "characteristic dimension" especially relates to one or more dimensions of the silica particles, such as a diameter, a length, a width, and a height. Especially, a characteristic dimension of silica particles may relate to a weight average mean characteristic dimension of the silica particles, such as a weight averaged diameter.

Especially, a characteristic dimension may relate to a plurality of different dimensions, especially related to two or more of the above described dimension. For instance a glass flake may comprise a first characteristic dimension related to a thickness (especially, the smallest dimension of the flake), and a second characteristic dimension related to a length (especially a largest dimension of the flake). In embodiments, the silica particles may comprise a first type of silica particles comprising a characteristic dimension selected from a first range (especially a range described above), and a second type of particles comprising a characteristic dimension selected from a further range (especially, also described above). For instance, in embodiments, the silica particles comprise a colloidal silica dispersion, especially comprising a characteristic dimension selected from the range of 0.1 nm to 500 nm, and glass flakes, especially comprising a characteristic dimension selected from the range of 1 to 100 µm.

In embodiments, silica particle size may range from a few nm as found e.g. in above described Ludox® colloidal silica dispersions up to 500 nm primary particle size as found in Aerosil™ (fumed silica). The Aerosil™ silica particles may typically comprise aggregated and agglomerated powders making up for sizes into the micrometer level.

Experimentally (see also below) it has been found that filling the coating base material with glass flakes increases the strength of the layer making it more resistant towards flaking of scale. It also has been found in embodiments that especially additional silica powder may have a further beneficial effect on the flaking of scale. Coating base material filled with only silica may result in brittleness of the layer when highly filled. Especially, the presence of glass flakes may decrease such sensitivity. In embodiments, the silica particles comprise glass flakes with a high aspect ratio. In further embodiments, the glass particles comprise micronized glass flakes from Glass Flake Ltd (code GF001) comprising a thickness (a first characteristic dimension) of 1-1.3 micrometer, especially wherein about 88% of the flakes may comprise a lateral size (a second characteristic dimension) of max 50 micrometer. Hence, the particles may have aspect ratios of at least 5, such as at least 10, like in the range of 10 to 1,000.

Especially, a large quantity silica powder may be beneficial for the ease of flaking. Especially, the coating may comprise large glass particles (fillers) if the coating comprises a large quantity of silica powder.

In order to produce coatings with improved mechanical properties, the quantity of filler in the steam promoter coating composition may be in the range 5 to 90% by weight of the total composition of the dried coating. Especially, the quantity of filler may be in the range of 40 to 85 wt. % (of the dried coating), even more especially in the range of 50 to 70 wt. % (of the dried coating). Herein the term "dried coating" especially relates to a coating wherein the water in the coating composition is substantially removed.

Also disclosed is a method of producing a coating at a surface, the method comprising providing a mixture comprising an alkali metal silicate and metal particles to the surface and curing the mixture at elevated temperature to form the coating. In embodiments, the mixture further comprises filler material, especially silica particles and/or glass particles. In further embodiments the mixture comprises colloidal silica. Especially, the mixture comprises a slurry (comprising the alkali metal silicate and metal particles, and optionally a filler (material).

Herein the term "mixture" may also be referred to as "lacquer".

Using the method, a coating may be provided at any surface. Especially, the method may be used to provide the coating according to the invention (at a surface) in a steam chamber of a steam generating device according to the invention. Hence in embodiments, the surface is a steam chamber surface for a steam chamber, especially of a steam generating device, and curing the mixture at elevated temperature comprises heating the steam chamber surface. Especially the mixture is provided at substantially the entire steam chamber surface. Especially, the mixture may be provided in the steam chamber, such as by spraying.

Especially, embodiments of the method may relate to embodiments of the steam generating device of the invention, especially of the coating as described herein. Embodiments of the steam generating device, especially of the coating may be provided by the method of the invention.

In embodiments, a ratio of the weight of the metal particles to the weight of the alkali metal silicate (in the mixture) is selected from the range of 0.001:1 to 3:1. In further embodiments, said ratio is selected from the range of 0.01:1 to 2:1. In yet further embodiments, said ratio may be selected from the range of 0.1:1 to 1.5:1.

The metal particles and the alkali metal silicate may react with each other in the mixture. Especially, they may react with each other at elevated temperatures, especially during curing, to provide the coating. Especially the metal particle (especially the metal element in said particle) and the alkali metal silicate may react with each other in a heterogeneous reaction. A speed of reaction may, e.g., be affected by a temperature during curing. A speed of reaction may also be tuned by a contact area between the metal particle and the alkali metal silicate. Hence, (many) particles having a small dimension may be preferred over (less) particles having a larger dimension. In embodiments of the mixture, a weight average mean diameter of the particles is selected to be smaller than or equal to 100 µm, especially smaller than or equal to 50 µm, such as smaller than or equal to 20 µm. Especially, a weight averaged mean diameter of the metal particles in the mixture is at least 0.01 µm, such as at least 0.1 µm, even more especially at least 1 µm, such as at least 2 µm. In embodiments, a weight averaged mean diameter of the particles in the mixture is selected from the range of 0.5 to 10 µm, such as 1 to 8 µm, especially 2 to 6 µm, even more especially 2 to 3 µm.

The particles do not need to have a spherical shape. The metal particles may have different kinds of shapes. Herein, the term "diameter" is especially used to refer to an "equivalent diameter", wherein the equivalent diameter of a particle having a volume may be defined by a diameter of a sphere having the same volume.

Especially, at least a part of the metal particles in the mixture react with the alkali metal silicate to provide a coating, especially a coating comprising the coating base material (comprising the mixed metal silicate) with metal particles as described herein. Especially, a size of a metal particle in the mixture may be larger than the size of the particle in the (final) coating. In embodiments, the mean diameter in the coating may be smaller than the mean diameter in the mixture, especially since metal particles are dissolved/have reacted. In other embodiments, the mean diameter in the coating may be larger than the mean diameter in the mixture, especially since predominantly the smallest metal particles may have dissolved/have reacted.

Hence, especially the coating according to the invention may comprise metal particles, wherein the metal particles have a weight averaged mean diameter selected from the range of 0.1 to 20 µm, especially from the range of 0.1 to 10 µm, even more especially selected from the range of 0.1 to 5 µm, such as 0.1 to 3 µm.

Also disclosed is a coating composition comprising an alkali metal silicate compound ("alkali metal silicate") and metal particles, especially wherein the weight averaged mean diameter of the particles is selected from the range of 2 to 6 µm. The coating composition is herein also indicated as "steam promoter coating composition".

Especially, the coating composition (further) comprises silica particles, such as described before. In embodiments, the coating composition (also) comprises colloidal silica.

Especially, the coating composition comprises the mixture according to the invention. Especially, embodiments of the composition may comprise embodiments of the mixture, and vice versa. Especially the coating composition comprises a liquid composition. Especially, the term "liquid composition" may relate to a flowable composition, such as a viscous liquid composition, a slurry or e.g. a dispersion.

Hence, in embodiments, especially of the coating composition, the metal particles comprise a second metal element selected from the group consisting of calcium, magnesium, zinc, and aluminum.

Especially, the ironing system comprises a steam iron, especially an integrated steam iron comprising a steam generation device and an ironing device in an integrated device. The coating compositions (according to the invention) can also be used for system irons having a separate steam chamber connected to the iron by a hose. Hence, in embodiments, the ironing system comprises a system iron.

Hence, this disclosure relates to a method of producing a coating in the steam chamber of a steam generating device. The method comprises preparing a mixture of an alkali metal silicate compound and metal particles, introducing the mixture into the steam chamber and curing the mixture at an elevated temperature to form the coating. Introducing the mixture into the steam chamber is especially carried out by spraying. Herein, (an) elevated temperature especially relates to a temperature of at least 80° C., such as at least 100° C., especially at least 160° C. In embodiments, the elevated temperature is selected from the range of 200 to 500° C. Especially, the elevated temperature is selected from the range of 200 to 400° C. Curing may especially be performed fast. In embodiments a time of curing (at elevated temperature) is equal to or less than 10 minutes, such as equal to or less than 5 minutes, especially equal to or less than 2 minutes, even more especially equal to or less than 1 minute. In further embodiments, the time of curing is at least 10 seconds, such as at least 20 seconds, especially at least 30 seconds, even more especially at least 1 minute. Especially, the time of curing (at elevated temperature) is selected from the range of 20 seconds to 2 minutes.

Especially, the method may be characterized in a metal particle that is mixed with an alkali metal silicate compound comprising solution (and successively may partly dissolve in/react with the alkali metal silicate). Suitable alkali metal silicates compounds are especially sodium silicate, lithium silicate and potassium silicate. The resulting slurry (usually having an increased viscosity), may then especially be applied to an aluminum substrate and cured at elevated temperature into a hydrophilic coating. A substantially insoluble, (porous) coating may be obtained. The obtained coating promotes the formation of steam, without the occurrence of flaking and/or other disadvantageous effects.

An additional advantage of the coating according to the invention is that suitable coatings can be obtained within a wide range of thicknesses. Due to the favorable rheology of the coating composition of the invention, and in particular its relatively low viscosity, rather thin coatings can readily be applied. The coating layer thickness can thus be tuned, depending on the specific type of steam promoter material used. Thick non-porous coating layers may prevent the Leidenfrost effect up to high temperatures. However, if the layer is too thick, the thermal conduction through the layer may limit the evaporation rate too much. Especially, at lower temperatures and high water dosing rates, water can leak out of the steam generating device. If the coating layer is too thin, the evaporation rates at low temperatures are higher. However, the steam generating device will in this case be more prone to the Leidenfrost effect, and water touching the surface can bounce off, leading to spitting of the steam generating device at high temperatures. For porous coating layers, high evaporation rates both at low temperatures (due to better spreading), and at high temperatures can be achieved. The layer thickness moreover may be limited by the mechanical properties of the coating material. Flaking may occur if coating layers exceed a certain critical thickness. Especially, coating layer thicknesses may vary between 1 and 200 μm, more especially between 20 and 150 μm, and even more especially between 30 and 120 μm. In embodiments, the coating layer thickness is selected from the range of 30 to 60 μm.

Herein, a thickness of the coating, especially relates to the smallest dimension of the coating. The (coating layer) thickness, especially relates to a mean (coating layer) thickness. Hence, in embodiments, the coating comprises a mean thickness selected from the range of 30 to 120 μm.

To improve the adhesion between the coating and the aluminum substrate, the aluminum can be cleaned by rinsing with organic solvent, and/or by mechanical means, such as sandblasting. Wetting of the aluminum surface can also be improved by adding surfactants to the coating mixture.

Curing of the coating composition (the mixture) is performed at elevated temperature, the specific curing (or drying) temperature being dependent on the composition of the coating. The uncured coating composition can be brought to the curing temperature by heating in an oven, or by any other heating source, such as infrared, ultrasonic, etc. Embodiments of the method of curing comprise heating the steam chamber surface itself. In this way the coating is cured from the inside to the outside surface thereof, which may have a beneficial effect on the properties of the produced coating. The inside surface especially relates to the surface closest to the aluminum substrate, the outside surface being the surface most remote from the aluminum substrate. Too fast drying/curing of the coating composition may result in boiling marks in the cured coating. It therefore is optional to preheat the steam chamber surface before application of the coating composition.

Especially, a steam promoter coating is described herein facilitating the transformation of water into steam. The layer is durable and keeps its function in time. Especially, scale, which still may build up, will not remove the steam promoter coating from the steam chamber when it starts to flake. From experiments, it is also shown that the coating according to the invention is resistant to deionized water. As consumers sometimes use deionized water in their steam iron to prevent any scale formation it is important that resistance to deionized water is good. It was shown that the combination of alkali metal silicate and glass powder results in a coating layer that, although it will prevent Leidenfrost effect, will erode in time when used with deionized water. The metal modified alkali silicates as described herein did not show erosion in time.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1:
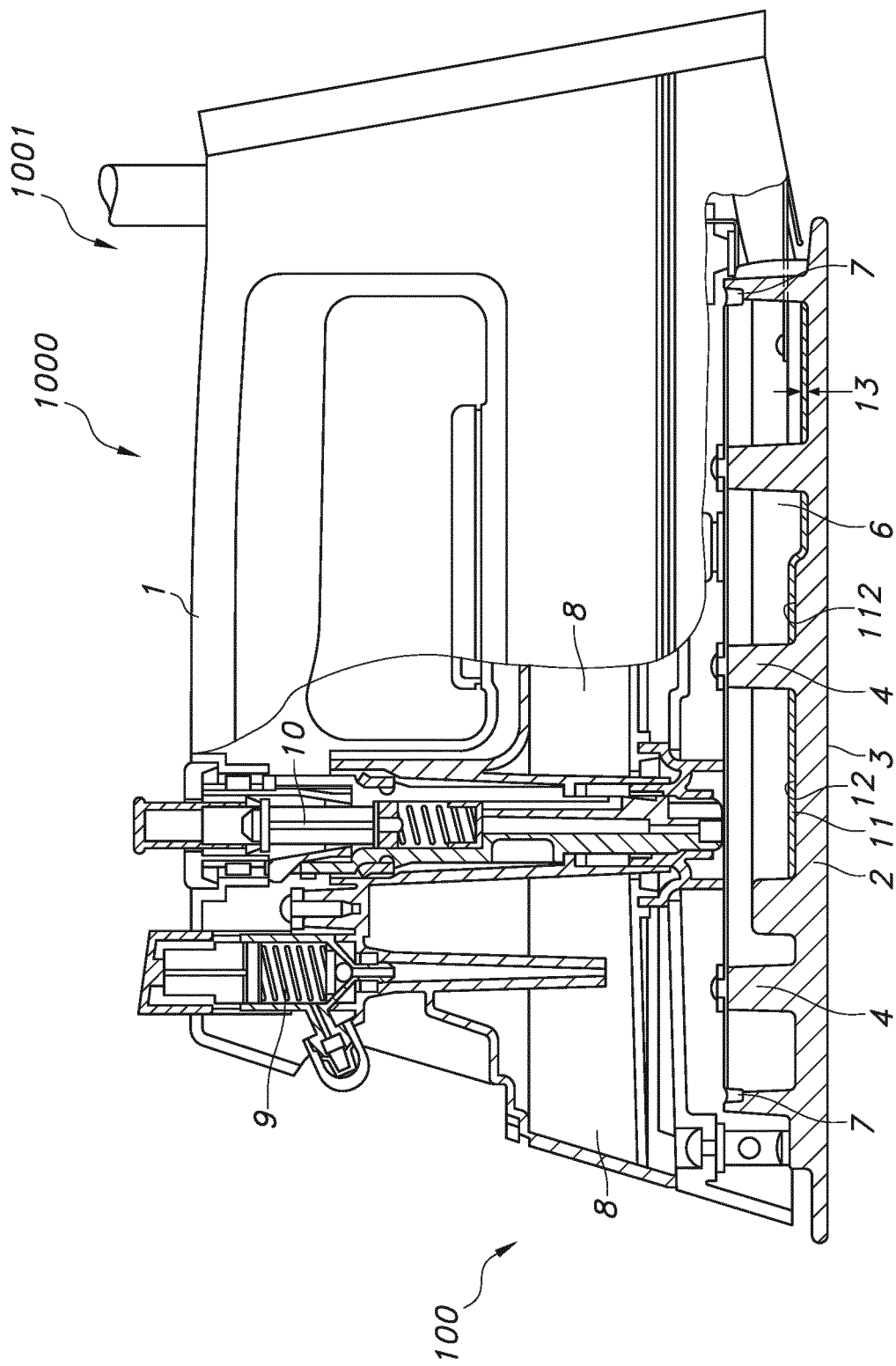
FIG. 1 schematically depicts an embodiment of an ironing system according to the invention.

FIG. 1 schematically depicts an embodiment of an ironing system 1000 comprising a steam generating device 100.

Especially, the depicted embodiment is a steam iron 1001. The steam iron 1001 comprises a housing 1 which is closed on the bottom side by an aluminum soleplate 2, which is provided with a thin layer of stainless steel on the underside 3. The soleplate 2 is provided with upright ribs 4 on the inside, on which ribs 4 an aluminum plate 5 is provided in such a manner that a steam chamber 6 is formed between the inside of the soleplate 2 and the plate 5. The steam chamber 6 is sealed by an elastic silicone rubber 7. The steam iron 1001 further comprises a water reservoir 8. By means of a pumping mechanism 9, water from the reservoir 8 can be sprayed directly onto the clothes to be ironed. By means of a pumping mechanism 10, water can be pumped from the reservoir 8 into the steam chamber 5, thus increasing the steam output. This water passes through an aperture (not shown) in plate 5 to the bottom of the steam chamber 6. The bottom of the steam chamber 6 comprises a surface 112, especially a steam chamber surface 12 that is provided with a coating 11, according to the invention, having a thickness 13. In embodiments, this thickness 13 is especially in the range of 30 to 120 μm. The steam generating device 100 depicted in FIG. 1 comprises a steam chamber 6 provided with a coating 11 according to the invention. Aspects of this coating 11 are amongst others depicted in FIG. 2.

Figure 2:
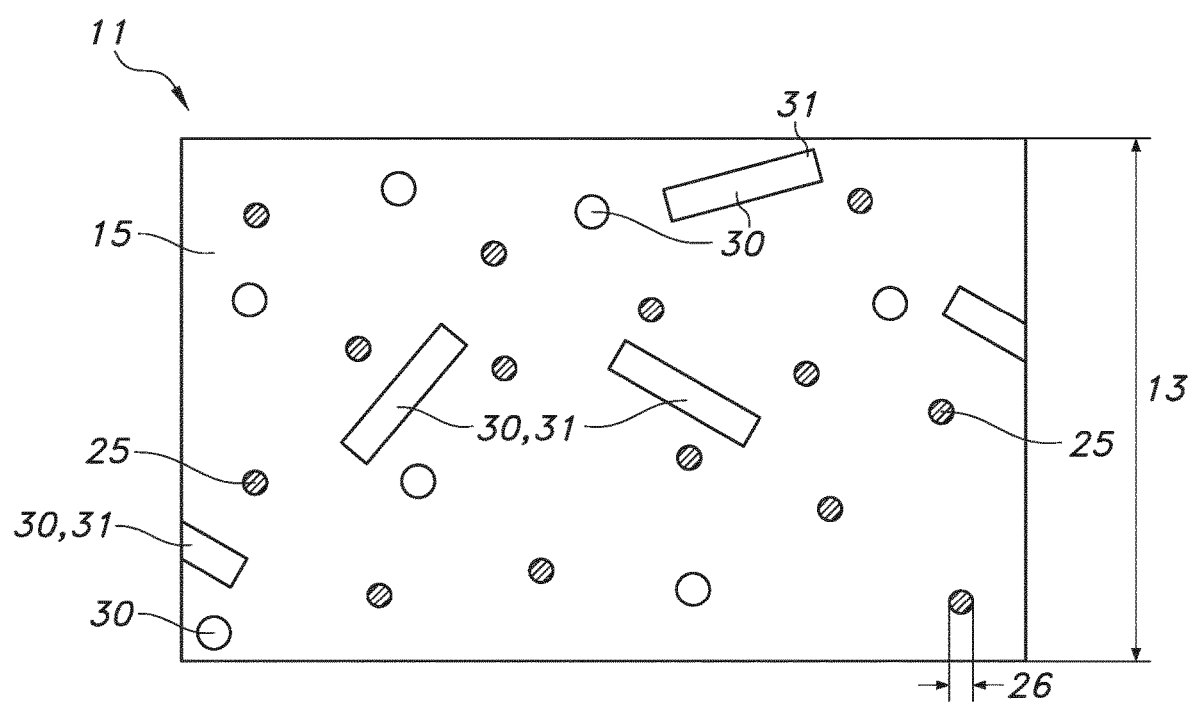
FIG. 2 schematically depicts aspects of the coating according to the invention.

In FIG. 2, a part of an embodiment of a coating 11 having a mean thickness 13 is schematically depicted, comprising a coating base material 15 with metal particles 25 embedded in the coating base material 15. In the depicted embodiment, the coating 11 further comprises a filler (filler material), especially silica particles 30, such as precipitated colloidal silica and glass flakes 31. In further embodiments, (other) silica particles may comprise different dimensions and shapes. In the schematically depicted coating 11, (only) a small amount of filler material is depicted. In embodiments, the amount of filler may be selected from the range of 50 to 70 wt. % of the (dried) coating.

The coating base material 15 comprises a mixed metal silicate compound. Especially such mixed metal compound comprises alkali metal elements and first metal elements. The metal particles 25 are at least partly embedded in the coating base 15 and comprise a second metal element. These metal particles 25 may especially have a weight averaged mean diameter 26 selected from the range of 0.1 to 5 μm. Substantially the entire metal particle is metal. Hence, especially at least 99% of a weight of the metal particles 25 may consists of the second metal element.

The invention is especially based on strengthening an alkali metal silicate by a metal to provide a mixed metal silicate (or an alkali metal/metal silicate). The improved characteristics of the alkali metal (/metal) silicate may be the result of a metal that may react with the alkali metal silicate, resulting an alkali metal/metal silicate compound with increased strength. The metal may dissolve in the alkali metal silicate because of the caustic environment (of the alkali metal silicate). Essentially, the first metal element and the second metal element relate to the same metal and therefore are essentially the same chemical element of the periodic table of the elements. In embodiments, the second metal element is selected from the group consisting of calcium, magnesium, zinc, and aluminum. In further embodiments the mixed metal silicate compound comprises one or more alkali metal elements selected from the group consisting of lithium, sodium, and potassium.

Figure 3:
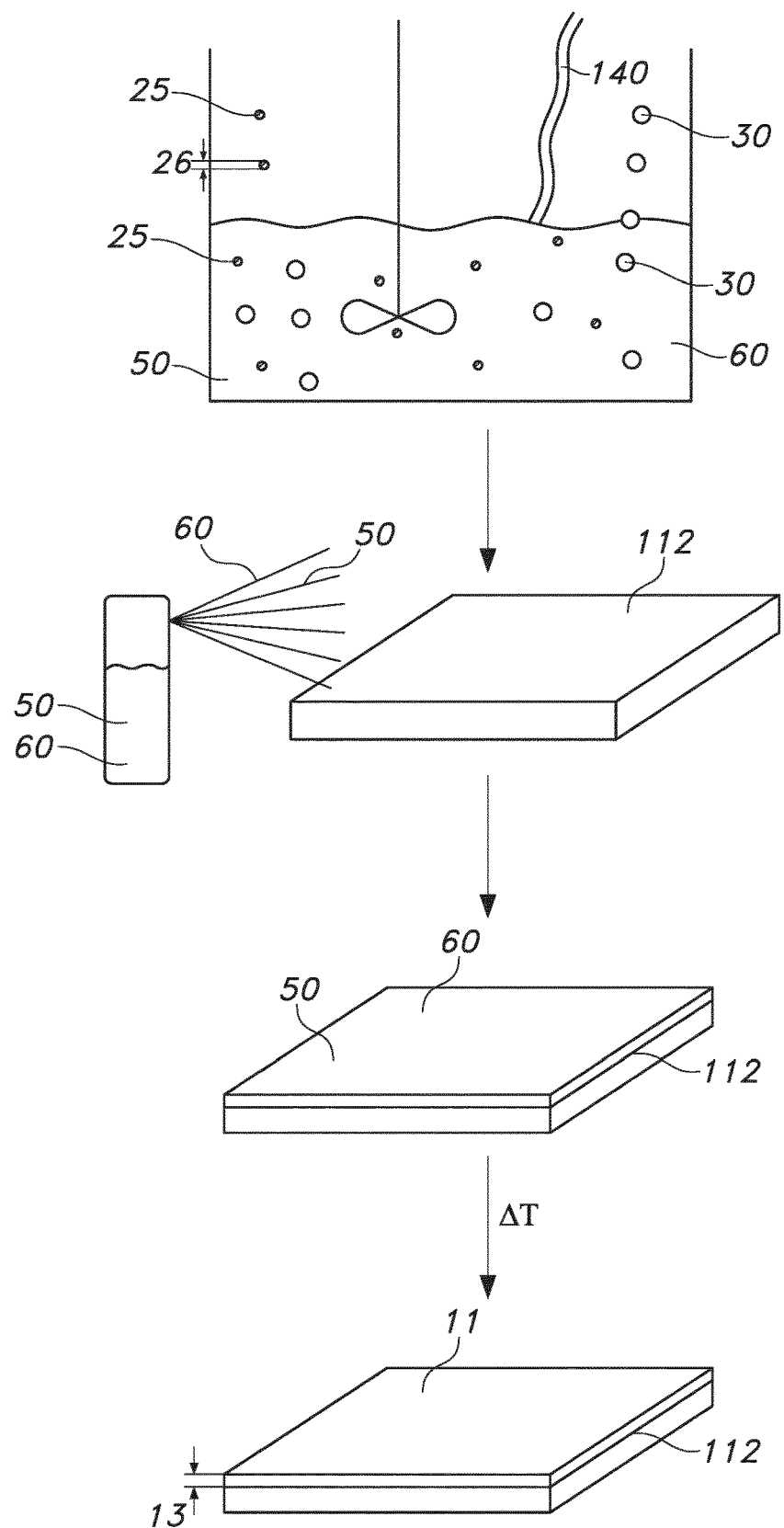
FIG. 3 schematically depicts some aspects of the method of producing a coating at a surface a coating to the invention.

The coating 11 may be provided by the method of producing a coating 11 at a surface 112, as described herein, see FIG. 3, depicting successive stages of the method). In such method, a mixture 50 comprising an alkali metal silicate 140 and metal particles 25 and optionally silicate particles 30 are prepared (depicted at the top of FIG. 3), provided to the surface 112, e.g. by spraying (middle two pictures in the scheme) and successively the mixture 50 is cured at (an) elevated temperature to form the coating 11 (shown at the bottom of the figure). Especially, curing may be provided at an elevated temperature in the range of 200 to 500° C. In embodiments of the method the weight averaged mean diameter 26 of the particles 25 is selected from the range of 2 to 6 μm to provide a mixture that especially may be sprayable and may provide the desired insolubility of the final coating 11 after drying (curing). Especially, the mixture or coating composition 60 is a liquid (flowable) composition. If the method is applied for a steam generating device 100, the surface 112 may especially comprise a steam chamber surface 12 for a steam chamber 6. In such embodiment, curing the mixture 50 at elevated temperature may advantageously comprise heating the steam chamber surface 12. Especially, the mixture 50 may be sprayed in the steam chamber 6 before installing the aluminum plate 5 (see FIG. 1).

In an embodiment, lithium silicate is mixed with zinc powder and sprayed at the steam chamber surface 12. After heating the steam chamber 6 to 300° C. strong zinc silicate bonds are formed with intrinsically higher strength than the native alkali silicate that is reacted silica. In another embodiment, potassium silicate is mixed with aluminum powder. After curing at 300° C. strong aluminum silicate bonds are formed with intrinsically higher strength than the native alkali silicate that is reacted with silica. Especially, the solubility of the formed mixed metal silicates is low, preventing any dissolution upon usage which may especially be advantageous for the application.

The mixture or coating composition 60 at least comprises an alkali metal silicate compound and metal particles 25, especially having a weight averaged mean diameter 26 of the particles 25 between 2 and 6 μm. To provide the desired coating 11, the metal particles 25 may in embodiments comprise a second metal element selected from the group consisting of calcium, magnesium, zinc, and aluminum.

Figure 4A:
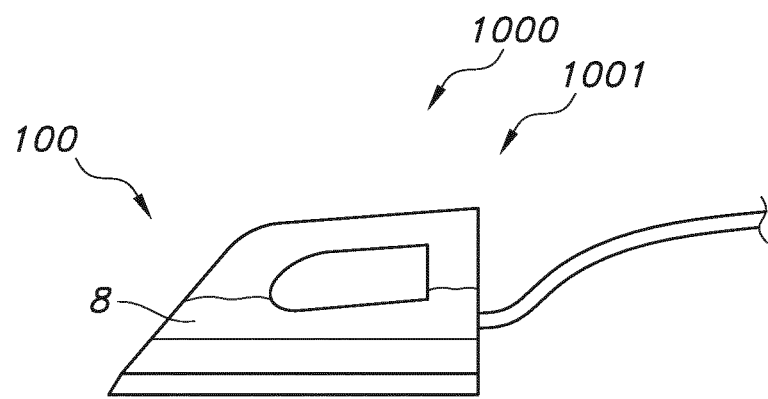
FIG. 4A-4B depicts some embodiments of an ironing system according to the invention.
Figure 4B:
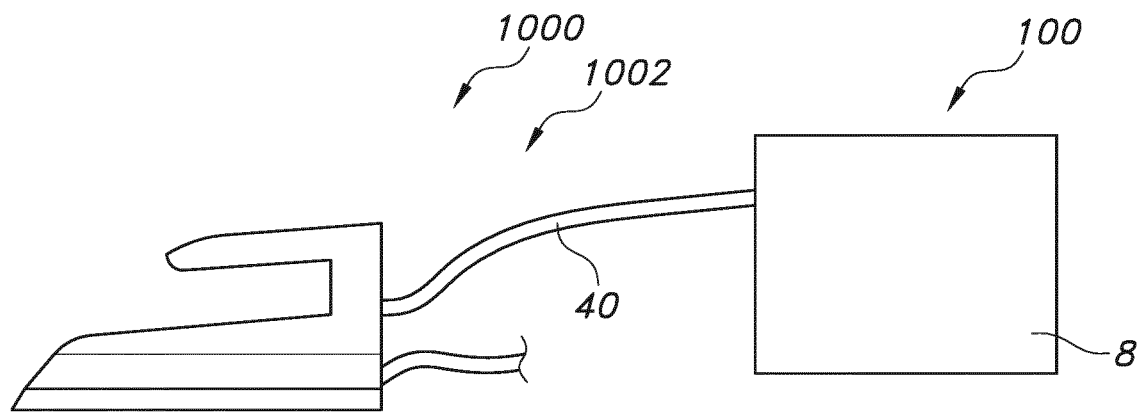

In FIG. 4A-4B some embodiments of an ironing system 1000 according to the invention are depicted. The ironing system 1000 comprise steam generating device 100 described herein. In FIG. 4A an integrated steam iron 1001 is depicted comprising a steam generation device 100, a water reservoir 8 and an ironing device in an integrated device. In FIG. 4B a system iron 1002 is depicted comprising a steam iron 1001 connected to a steam generating 100 with a water reservoir 8 via a steam transport hose 40.

Chemicals

Lithium silicate (LiSi) (20% in water), Ludox As40, and Zinc powder (2-5 μm) were obtained from Sigma Aldrich; Potassium silicate (Kasolv 205) was obtained from PQ Corporation; Aerosil OX50 silica powder was obtained from Evonik; Glass flakes (GF001) were obtained from Glass Flake Ltd; Aluminum powders were obtained from Eckart; examples of the applied Aluminum powders are WA23 (spheres with mean size 2.3 μm), WA55 (spheres with mean diameter 5.5 μm), PCR 1100 (flakes with mean diameter 8 μm), RO550 (flakes with mean diameter of 20 μm).

Lacquer Preparation

A typical lacquer preparation was as follows:

Potassium silicate based: 5 g. WA23 aluminum powder was mixed with 3 g. water and stirred until the powder had dispersed into a paste. To the paste a solution of 8.4 g. Kasolv 205 in 30 g. As40 (40% colloidal silica in water) was added followed by 9 g. GF001 glass flakes. Additionally 2.5 g. Aerosil OX50 fumed silica powder was added. The high viscous material can be diluted with additional DI water to obtain the proper viscosity for spraying Lithium silicate based: 2grWA23 was dispersed in 31 g. Lithium silicate solution. 9 g. GF001 glass flakes were added followed by 10 g. OX50 silica powder. Additional water can be added for sprayability.

Application and Drying

Steam promoter formulations (lacquers) were sprayed into the steam chamber of a soleplate of a steam iron. After spraying the heating element that was embedded in the soleplate was used to heat the soleplate and dry the coating. Heating was continued till the soleplate reached 300° C.

Resistance to DI Water

In a typical experiment an open soleplate with a steam promoter layer applied in the steam chamber was heated to 240° C. DI (DeIonized) water was continuously dripped onto the layer and transformed into steam. After 10 l. of water the layer was inspected for color deviations and change in structural appearance. The impact of Aluminum and Zinc powder on the resistance of alkali silicate towards DI water was evaluated in the following experiments.

Aluminum Potassium Silicate

WA23 aluminum powder was mixed with 3 g. water and stirred until the powder had dispersed into a paste. To the paste a solution of 8.4 g. Kasolv 205 in 45 g. As40 was added followed by 9 g. GF001 glass flakes. The high viscous material can be diluted with additional DI water to obtain the proper viscosity for spraying. The amount of WA23 aluminum powder used in the series of experiments was chosen from 0, 1, 2 and 5 gr.

Testing according the description showed the sample without any aluminum powder having turned white with a powdery appearance. The sample with 1 g. powder had improved significantly with less whitening and color change. The 2 g. sample had improved even more while the sample with 5 g. WA23 powder showed no appearance deviation from the original grey color.

Zinc Potassium Silicate

Similar experiments were done by using Zinc powder where 1 gram Zinc powder showed whitening of the layer but 5 g. and 10 g. Zn powder showed no change upon testing with DI water.

Zinc Lithium Silicate 31 g. Lithium silicate solution was mixed with 9 g. GF001 and 10 g. Ox50 silica. The layer based on this material was turning white upon testing with DI water. Mixing 31 g. Lithium silicate solution with 9 g. GF001 and 18 g. Zinc powder gave a layer that did not change color or appearance upon dosing DI water at 240 C.

Aluminum Potassium Silicate 8.4 g. Kasolv 205 in 20 g. water was mixed with 9 g. GF001 glass flakes and 5 g. WA23 aluminum powder.

The layer made from this was resistant to DI water at 240° C. contrary to the aluminum free material.

Metal Powder Vs Soluble Metal Salts

Using metal powder contrary to soluble metal salts may be advantageous effect, especially because adding non-alkali metals in the form of a soluble metal salt may lead immediately to gel formation as the reaction of the silicate with the metal ions may lead to insoluble structures and hence gel particles or full gelation upon mixing. The high reactivity of metal salts towards alkali silicate solutions is experimentally studied. In a typical experiment 0.5 g. $Al(NO_3)_3$ was dissolved in a small amount of water and added to 30 g. Lithium silicate solution. Immediate gelation took place. The same happened when e.g. $CaCl_2$) or $Zn(Acetate)_2$ solutions were added in the same way.

Gel formation also happened when using a Potassium Silicate solution (8.4 g. Kasolv 205 in 20 g. water) and adding the solutions of the salts mentioned above.

The immediate reaction of the metal ions with the silicate leads to full gelation or formation of gel particles giving rise to inhomogeneous materials that are difficult to spray.

The metal powders can be easily dispersed into the silicates and their reactivity at room temperature is low enough to avoid premature gelation and therefore allow for sufficient pot life to make them usable in a production environment. Upon heating/curing the metal powders will (partly) dissolve and form the corresponding metal silicate strengthening the material to avoid any dissolution in water.

As the reaction with the metal powder is heterogeneous a high surface area metal powder (small particle size) is especially preferred. This is to ensure that sufficient metal ions coming from the powder will migrate into the silicate matrix.

Resistance to Scale Flaking

In a typical experiment an open soleplate with steam promoter layer applied in the steam chamber was heated to 240° C. Hard water was continuously dripped onto the layer and transformed into steam.

After a few h. steaming a layer of scale had formed on top of the steam promoter. The heating and dripping was stopped. Cooling was done by slowly leaving in ambient or enforced by adding copious amount of cold water hence generating high stresses in the layer.

The scale (when sufficiently thick) was flaking from the steam promoter due to internal stress build up. Resistance of the steam promoter layer to the flaking of the scale was checked by subsequently reheating again to 240° C. and checking for steaming performance. A properly designed steam promoter layer was able to show good steaming and no Leidenfrost effect after flaking of the scale and be able to withstand at least 7 cycles of steaming/scale formation/flaking. When a steam promoter has insufficient strength, the flaking will be in the steam promoter layer itself or at the interface of the steam promoter to the aluminum base and not at the interface of coating and scale. Upon flaking the scale will remove part of the steam promoter leading to Leidenfrost effect.

Different types of water were used in the testing.

The first hard water was based on an IEC standard and is made in the following way: Stock solutions of $CaCl_2.2H_2O$ (65.6 gr/l), $MgSO_4.7H_2O$ (38 gr/l.) and $NaHCO_3$ (76.2 gr/l.) were made. This standard hard water was made by mixing 50 gram of each stock solution into 9 liter of de-ionized water and adding up to 10 liter. The resulting water had a total hardness of 16.8° DH and a temporary hardness of 11.2° DH. Total hardness is defined as $2.8\times2\times[mmol\ Ca^{2+}/l.+mmol\ Mg^{2+}/l.]$. Temporary hardness is defined as $2.8\times[mmol\ HCO_3^-/l.]$.

A second type of water was from natural source with both total and temporary hardness of 14° DH.

The type of scale was different from both waters. The scale form the IEC water was more soft and fluffy in nature while the scale from the natural water was typically hard and dense.

An embodiment of a steam promoter that showed resistance towards scale flaking is based on the following lacquer:5 g. WA23 aluminum powder, 8.4 g. Kasolv 205, 30 g. As40, 9 g. GF001 glass flakes and 2.5 g. Aerosil OX50 fumed silica powder.

When low amount aluminum powder is used not only DI water resistance is compromised but also strength. For example a layer based on 8.4KSi/10OX50/9E/1WA23 shows insufficient strength to survive scale flaking.

A steam promoter based on a silicate with comparably large aluminum flakes like e.g. PCR 801 (particles with a mean of 14-20 micron but with particles up to 40 micron) will be too low in strength/adhesion to survive flaking.

For example a steam promoter based on 31.6 g. LiSi, 9 g. GF001 and 5 g. or 18 g. PCR801 will show strong Leidenfrost effect after the scale flaking. The scale had almost completely removed the layer from the soleplate.

Fillers

The choice of fillers also determines strength. Silica based fillers are especially preferred over alternative fillers. Silica interferes directly with alkali silicate and helps in strengthening the final material.

Metal silicates are not reacting with the alkali silicate in the way silica can do which is reflected directly in flaking resistance For example a layer based on LiSi, WA23 and GF001 flakes is used as starting material. Filing this starting formulation with As40 silica may give a flaking resistant layer. Filling with $CaCO_3$ or Talcum ($Mg_3Si_4O_{10}(OH)_2$) or Mica (mixed metal silicate containing e.g. Ca, Mg and Al) or $CaSiO_3$ especially may not.

Besides the benefit of silica filling over other fillers it also shows again the importance of the metal powder filling.

Metal ions introduced in the form of a soluble salt especially have shown to be too reactive causing gelation as mentioned above. Metal ions bonded into silicates, carbonates etc. are low reactive and give a low strengthening effect. The metals are already bonded in a non-soluble crystal structure and not available for reacting with the alkali silicate. Metal ions coming from metal powder may especially be a good way to balance reactivity and ease of use in alkali silicate based steam promoter.

Experimentally, also metal ions bonded to hydroxide did not show a beneficial effect to the strength of the layer. For example a coating layer based on the potassium silicate composition as described in the lacquer preparation part was used but the aluminum powder was replaced with 2.5 gr. $AlOH_3$ or 5 gr. $AlOH_3$. In both cases no viscosity increase occurred. After application, the layer was subjected to the DI water test showing compromised strength and especially adhesion problems to the aluminum soleplate.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. An ironing system comprising a steam generating device comprising a steam chamber provided with a coating comprising a coating base material with metal particles at least partly embedded in the coating base material, wherein the coating base material comprises a mixed metal silicate compound, wherein the mixed metal silicate compound comprises an alkali metal element and a first metal element, wherein the metal particles comprise particles of a second metal element, and wherein the first metal element and the second metal element are the same chemical element of the periodic table of the elements.

2. The ironing system according to claim 1, wherein the second metal element is selected from a group consisting of calcium, magnesium, zinc, and aluminum.

3. The ironing system according to claim 1, wherein the mixed metal silicate compound comprises one or more alkali metal elements selected from a group consisting of lithium, sodium, and potassium.

4. The ironing system according to claim 1, wherein the metal particles have a weight averaged mean diameter selected from a range of 0.1 to 5 µm.

5. The ironing system according to claim 1, wherein the coating further comprises silica particles.

6. The ironing system according to claim 1, wherein the coating further comprises glass flakes.

7. The ironing system according to claim 1, wherein at least 99% of a weight of the metal particles consists of the second metal element, and wherein the coating comprises a mean thickness selected from a range of 30 to 120 μm.

8. The ironing system according to claim 1, wherein the ironing system is a steam iron.

9. The ironing system according to claim 1, wherein the second metal element comprises a metal element having a valence higher than 1.

10. The ironing system according to claim 1, wherein a ratio of a weight of the metal particles to a weight of alkali metal silicate, comprised in the mixed metal silicate compound, is selected from a range of 0.001:1 to 3:1.

11. The ironing system according to claim 5, wherein the silica particles have a weight averaged diameter selected from a range of 0.1 to 1000 nm.

12. The ironing system according to claim 1, wherein the second metal element is selected from a group consisting of gallium, indium, copper, and nickel.

* * * * *